Figure 6:
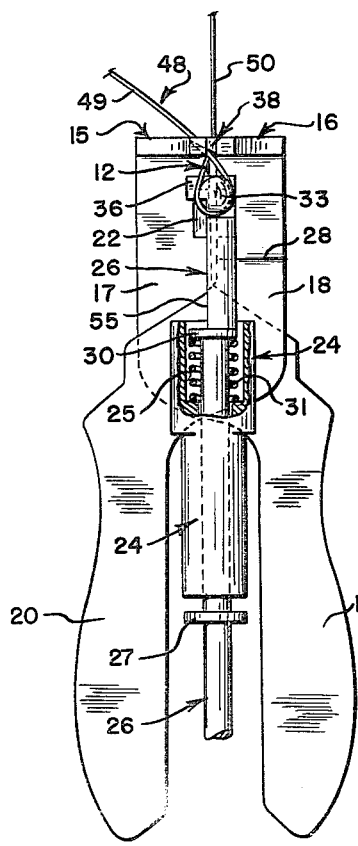

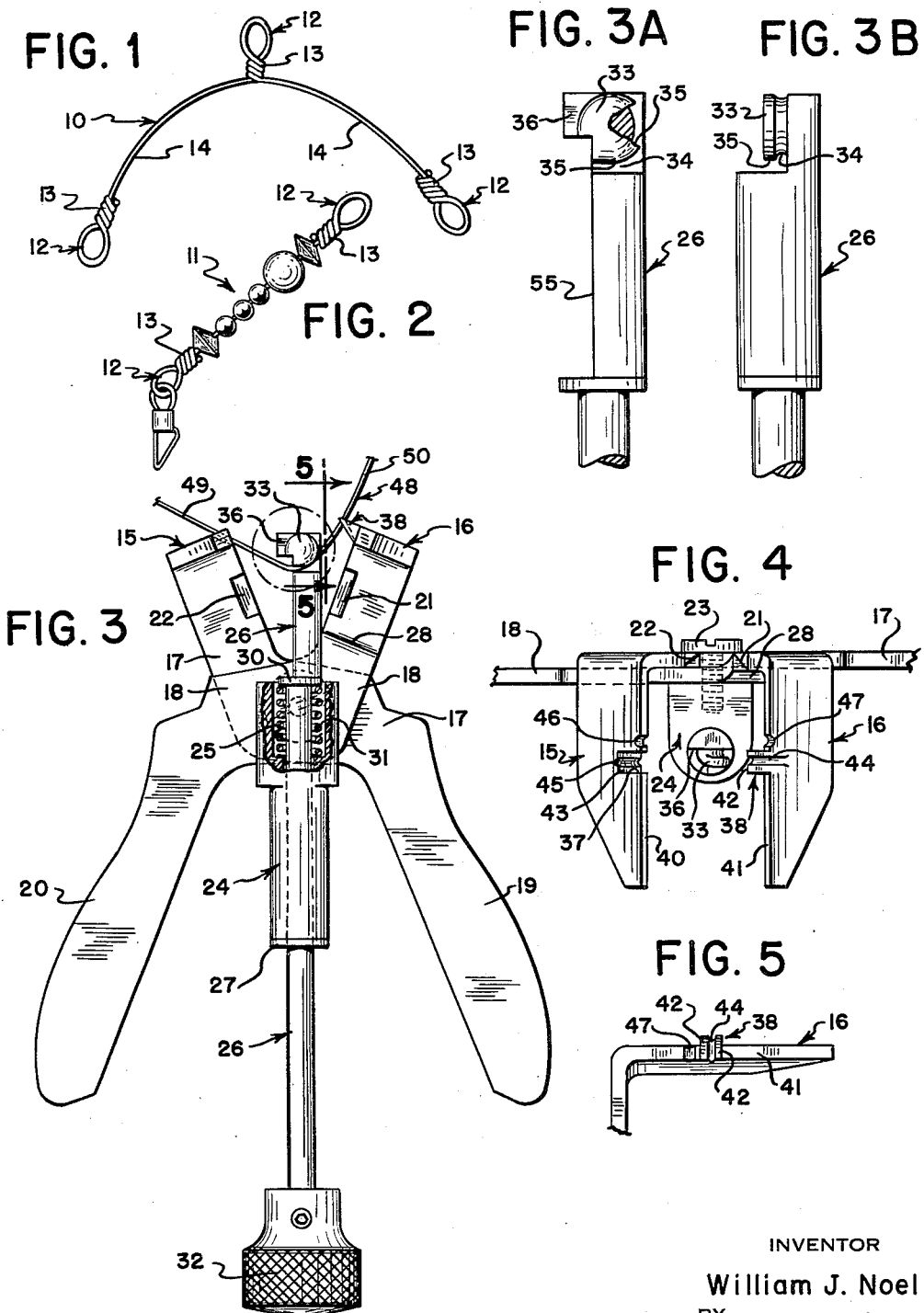

Dec. 7, 1965   W. J. NOEL   3,221,779
DEVICE FOR FORMING EYES IN WIRE
Filed Aug. 29, 1962   2 Sheets-Sheet 2

INVENTOR
William J. Noel
BY
Burton Perlman
ATTORNEYS

United States Patent Office 3,221,779
Patented Dec. 7, 1965

3,221,779
DEVICE FOR FORMING EYES IN WIRE
William J. Noel, Covington, Ky., assignor of one-third each to Robert A. Broerman and William E. Broerman, both of Cincinnati, Ohio
Filed Aug. 29, 1962, Ser. No. 220,236
4 Claims. (Cl. 140—104)

This invention relates to wire forming and twisting devices and more particularly to a device for the forming of eyes in wire. The invention will be of particular interest to the earnest fisherman who wishes to make his own leaders and lures.

A fisherman commonly uses a wire extension at the end of his fishing line, so that a fish, upon being caught, will be unable to break or cut the line and escape. This wire extension is called a leader. Attached to the leader may be a lure, which is the name for a device attractive to fish. A hook or a plurality of hooks, may be attached to the lure or to the leader directly. It is true that there are commercially available a considerable assortment of leaders and lures. Yet for those to whom fishing is an art, the preparation of leaders and lures is a highly individual matter, and initiates prefer to manufacture their own.

In fabricating such items an important step is the formation of small eyes in the wire, which eyes result upon bending the wire into a loop, and then wrapping one branch of the wire about the other in tight coils to define the eye. It should be pointed out that it is generally desirable that the eyes be small and the coils above the eye be closely spaced. In making a lure, varoius elements attractive to fish are threaded on a wire, and eyes may be formed in the wire to retain the attractive elements on the wire. Eyes are likewise useful in providing a means whereby a hook may be directly attached to a line or leader. This may be done by using a coupling member which may be attached both to a hook and an eye. Alternatively it may be desired to form an eye with a hook directly engaged therewith.

While these comments describe the simple functions of an eye in wire used in fishing, the formation of such eyes presents considerably more difficulty. They can be made manually without the use of equipment, but this is a time consuming feat, the results of which are generally less than satisfactory, for it is important that the eyes be small, and the coils tight. It is very difficult to achieve these objectives by hand.

Accordingly, it is the primary object of this invention to provide an eye forming device which is simple to use and produces uniformly small eyes and tight coils.

Another object herein is to provide a device which permits the formation of eyes in wire into which eyes a fish hook or like element may be directly included.

Still another object of the present invention is to provide a device of the character described which is small, portable, and may readily be manipulated by a fisherman at his fishing spot without the need for other equipment.

Figure 8:
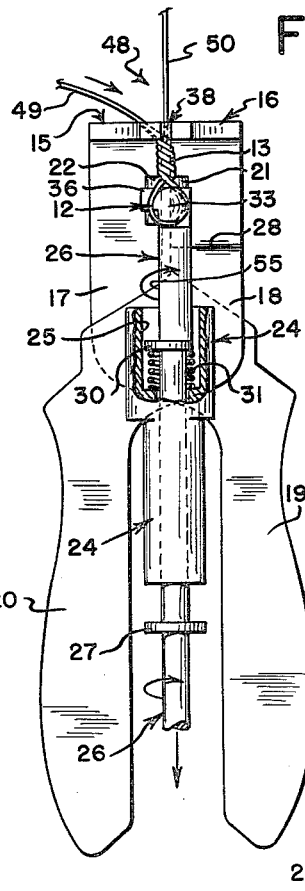
Figure 9:
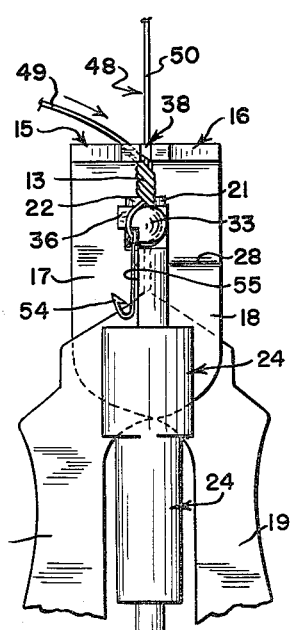
Figure 7:
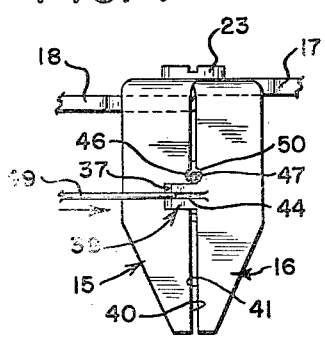
Figure 10:
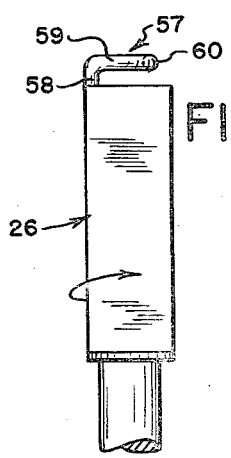
Figure 11:
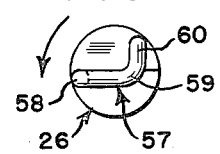

How these and many other objects are to be implemented will become clear through a consideration of the accompanying drawings wherein:

FIG. 1 depicts a spreader;
FIG. 2 depicts a lure;
FIG. 3 shows an embodiment of the present inventive device in elevation view, the device being in open position;
FIG. 3A is an enlarged view at one end of the shaft within the portion circled in FIG. 3;
FIG. 3B is a side view of the enlarged subject matter seen in FIG. 3A;
FIG. 4 is a plan view of the device shown in FIG. 3 but with wire omitted;
FIG. 5 is a view taken at 5—5 of FIG. 3;
FIG. 6 is an elevation view of the device shown in FIG. 3 in closed position;
FIG. 7 is a plan view of the device as seen in FIG. 6;
FIG. 8 is a view similar to that seen in FIG. 6 after coils have been formed in the wire;
FIG. 9 is a view similar to FIG. 8 in which a hook is included in the eye which has been formed;
FIG. 10 is an elevation view of a second embodiment of wire die and retaining means at the top of a shaft; and
FIG. 11 is a plan view of the embodiment seen in FIG. 10.

In the drawings are shown a spreader 10 and a lure 11, to either of which hooks may be attached. It will be noted that each of them has eyes 12 formed therein, each eye being essentially a loop of wire with definition of each eye being maintained by winding a coil of wire 13 about a linear portion of wire 14. It is to the formation of eyes 12 with their associated coils of wire 13 that the present invention is directed.

In the embodiment of the present device for forming the subject matter referred to in the preceding paragraph shown in FIGS. 3–9 there is a pair of jaws 15 and 16, each being integral with an arm 17 and 18 respectively. Each of the arms has a handle portion 19 and 20 respectively, pressure on such handle portions moving the jaws together. The arms are pivotally mounted in the manner of pair of pliers to pivot about a screw 23. A wire cutter may be included in the device, by providing cutter edges 21 and 22 in arms 17 and 18. In order that wire cutter edge 21 and 22 will meet when the jaws of the device are closed, arm 18 is bent at 28.

Screw 23 also holds a sleeve 24 in the assembly, such sleeve having a cavity 25 therein. Shaft 26 extends through the sleeve 24 and cavity 25. Lower snap ring 27 upon shaft 26 limits upward movement of the shaft 26 relative to the sleeve 24. There is an upper snap ring 30 upon shaft 26 at the top of sleeve 24. A spring 31 is disposed within cavity 25 and about the portion of shaft 26 therein. Such spring 31 is confined within the cavity 25 by the upper snap ring 30 upon the shaft 26. Knurled knob 32 is keyed to one end of shaft 26, and the shaft may be rotated by means of such knob.

At the other end of shaft 26 occurs what may be designated a wire die and retaining means. In the embodiment seen in FIGS. 3–9, such means, best seen in FIGS. 3A and 3B, consists of a button 33 which is undercut to provide a recessed groove 34 and an overhanging lip 35 and a wing 36 whose function will be presently explained.

In the embodiment of the invention seen in FIGS. 3–9, and best seen in FIG. 4, jaw 15 has a recess 37 therein and jaw 16 has a lug portion 38 projecting towards recess 37. Each of the jaws 15 and 16 has an abutting surface 40 and 41 respectively, while lug portion 38 and recess 37 have abutting surfaces 42 and 43 respectively. Jaws 15 and 16 may be moved together to abutting relationship, as seen in FIGS. 6 and 7. When the jaws are in abutting relationship, abutting surfaces 40 and 41 will be in contact, while lug portion 38 will be in registry with recess 37.

There is a groove 44 extending across abutting surface 42 of lug portion 38, such groove opening into the top of lug portion 38 to provide a wire retaining notch at the top of lug portion 38. When lug portion 38 is moved into registry within recess 37, such groove 44 will mate with a second groove 45 across abutting surface 43 of recess 37. Such mating grooves 44 and 45 provide a guideway through the jaws 15 and 16 when closed, through which guideway a wire may readily be withdrawn.

Likewise, groove 46 extends across abutting surface 40 in jaw 15, groove 46 opening into the top of jaw 15 to provide a wire retaining notch. There is a groove 47 for mating with groove 46 extending across abutting surface 41 of jaw 16. When jaws 15 and 16 are closed, the mating grooves 46 and 47 provide a second guideway through which wire may pass, the wire being free to rotate or move therein.

To operate the present device, the jaws 15 and 16 are moved to spaced relationship as shown in FIG. 3, and a length of wire 58 is disposed therein. Such wire is disposed in the groove portion 34 of button 33, with lip portion 35 confining the wire, and the free portions of the length of wire 48 disposed within the notches provided by grooves 44 and 45. The operator then presses handle portions 19 and 20 of the device together, whereupon jaws 15 and 16 will be moved into abutting relationship. When the device is so actuated the length of wire 48 will be wrapped about button 33, and the free portions of the length of wire will extend through the guideways resulting by mating grooves 44 and 45, and mating grooves 46 and 47. Because of the lug and recess construction, one portion 49 of the length of wire 48 will cross the other portion 50 as may best be seen in FIG. 6. The guideways are sufficiently large that the wire portion passing therethrough may freely turn. The eye is now formed. There now remains the coiling of one portion of wire about the other so that the eye is made permanent.

This is accomplished by rotation by the operator of the shaft 26 by means of knurled knob 32 after the jaws 15 and 16 have been closed. Thus, portion 49 of length of wire 48 is wound about portion 50 to provide a tight coil 13 upon rotation of the shaft. It will be noted in FIG. 8 that as rotation occurs spring 31 is compressed because the formation of the windings of the coil 13 in FIG. 8 causes the shaft 26 to move downwardly relative to sleeve 24. Upon compression of the spring, an upward force urges shaft 26 in the direction of jaws 15 and 16. The purpose of the spring is to assure that the windings of coil 13 in FIG. 8 are tightly spaced as they are being formed.

While the shaft 26 is being rotated, lip portion 35 of button 33 serves to confine wire 48 within the groove portion 34 of the button, and prevent its escape therefrom. Such lip portion 35 also provides a bearing surface for side 52 of the eye 12 in FIG. 8, forcing the eye to rotate with the shaft. In addition, wing 36 pushes the other side 53 of eye 12 in FIG. 8, additionally impelling the eye to rotate with the shaft 26.

Sometimes it is desired to wrap an eye with a fish hook 54 already threaded therein, as indicated in FIG. 9. In order to make this possible the shaft 26 has a longitudinal flat surface 55 terminating adjacent button 33 as may be seen in the drawings. By providing such flat surface 55 the hook 54 is permitted to lie substantially axially parallel to the shaft 26 and to turn therewith. Were such a flat surface not provided, the hook would be compelled to extend more or less radially from the shaft. This would interfere with rotation of the shaft for the hook would then come into contact with arm 17, preventing further rotation of the shaft.

As shaft 26 in FIG. 8 is rotated to form windings of a coil, the signifance of the guideways provided by mating grooves 44 and 45, and mating grooves 46 and 47 will be appreciated. As the eye 12 in FIG. 8 is rotated, portion 49 of the length of wire 48 may freely move through the guideway in which it lies, and be wound about portion 50 of the length of wire 48. The guideway in which wire portion 50 rests also permits such wire portion 50 to rotate within such guideway, so that undue torsional stress on the wire and possible breakage thereof will not result.

In FIGS. 10 and 11 is depicted another embodiment of wire die and forming means at the top of a shaft 26. It will be understood that the embodiment illustrated in FIGS. 10 and 11 may simply be substituted in the entire device as illustrated in FIGS. 3 through 9 in place of shaft 26 shown therein. The embodiment in FIGS. 10 and 11 employs a bent member 57 connected to the top of the shaft by connector 58, the bent member 57 being spaced from the top of the shaft as seen in FIG. 10. The bent member 57 has a forming portion 59 about which wire may be wrapped to form an eye. Extending at an angle from forming portion 59 is a retaining portion 60 which will retain the wire formed into an eye about forming portion 59 when shaft 26 is rotated in the direction indicated in FIG. 11.

While I have described my invention in considerable detail in connection with the specific structures shown in the drawings, it will be understood that such structures can be modified or altered, and the resultant structure resultant upon such modification or alteration, may still fall within the ambit of my invention.

I claim:

1. A device for forming an eye in wire comprising a pair of wire supporting jaws capable of being moved from spaced to abutting position, pivot means for said jaws, handle means for moving said jaws, a shaft housing fixed to said jaws adjacent the pivot point, a rotatable shaft mounted in said housing, wire die and retaining means on one end of said shaft adjacent said jaws and shaft rotating means at the other end of said shaft, said wire die and retaining means being substantially in the plane of the jaw ends when the jaws are in spaced position and being below the jaw ends when the jaws are in abutting position, one of said jaw ends having a pair of spaced grooves along an edge thereof, said other jaw end having a pair of spaced grooves mating with said first pair of grooves whereby one portion of said wire is received in one pair of mated grooves and another portion of said wire is received in the other pair of said mated grooves, said wire die and retaining means having a lip portion extending radially thereof and adapted to form an open loop in said wire upon closing of the wire supporting jaws, said shaft being capable of downward movement upon rotation thereof whereby one portion of the wire may be helically wrapped around another portion of the wire to form an eye.

2. A device for forming an eye in wire as claimed in claim 1 including a spring mounted in said shaft housing for normally urging said shaft toward said movable wire supporting jaws.

3. A device for forming an eye in wire as claimed in claim 1, said lip portion having an overhanging portion for retaining the wire about said lip portion during rotation of said shaft.

4. A device for forming an eye in wire as claimed in claim 1, said rotatable shaft having a flattened portion thereon for accommodating a hook suspended on the wire during rotation of said shaft.

References Cited by the Examiner

UNITED STATES PATENTS

| | | | |
|---|---|---|---|
| 376,694 | 1/1888 | Wear | 140—102.5 |
| 397,635 | 2/1889 | Flatau | 140—118 |
| 465,105 | 12/1891 | Wilson | 140—102.5 |
| 763,445 | 6/1904 | Vogelzang | 140—102.5 |
| 1,846,933 | 2/1932 | Barnes | 140—117 |
| 3,093,184 | 6/1963 | Moon | 140—124 |

FOREIGN PATENTS

| | | |
|---|---|---|
| 566,754 | 11/1923 | France. |
| 978,687 | 11/1950 | France. |

CHARLES W. LANHAM, *Primary Examiner.*

WILLIAM F. PURDY, *Examiner.*